United States Patent
Liu et al.

(10) Patent No.: US 7,242,727 B2
(45) Date of Patent: Jul. 10, 2007

(54) METHOD OF DETERMINING TRANSMIT POWER FOR TRANSMIT EIGENBEAMS IN A MULTIPLE-INPUT MULTIPLE-OUTPUT COMMUNICATIONS SYSTEM

(75) Inventors: Jung-Tao Liu, Randolph, NJ (US); Youjian Liu, Boulder, CO (US); Ashok Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 757 days.

(21) Appl. No.: 10/401,670

(22) Filed: Mar. 31, 2003

(65) Prior Publication Data
US 2004/0190643 A1     Sep. 30, 2004

(51) Int. Cl.
*H04L 27/04* (2006.01)
*H04B 7/00* (2006.01)

(52) U.S. Cl. .................................. 375/295; 455/522
(58) Field of Classification Search ............. 375/295, 375/315; 455/522, 453, 133; 370/329
See application file for complete search history.

(56) References Cited

U.S. PATENT DOCUMENTS

| | | | | |
|---|---|---|---|---|
| 6,862,271 | B2 * | 3/2005 | Medvedev et al. | 370/329 |
| 7,020,482 | B2 * | 3/2006 | Medvedev et al. | 455/522 |
| 2004/0023004 | A1 * | 2/2004 | Kimpimaki | 375/267 |

\* cited by examiner

*Primary Examiner*—Khai Tran

(57) ABSTRACT

In the method according to the present invention, a transmit power for each eigenbeam in a set of eigenbeams forming at least a portion of a multiple transmit antenna system is determined based on noise associated with each eigenbeam in the set of eigenbeams. The set of eigenbeams is for transmitting a number of parallel complex Gaussian channels.

11 Claims, 2 Drawing Sheets

METHOD OF DETERMINING TRANSMIT POWER FOR TRANSMIT EIGENBEAMS IN A MULTIPLE-INPUT MULTIPLE-OUTPUT COMMUNICATIONS SYSTEM

BACKGROUND OF THE INVENTION

Antennas are part of some of the more critical components of a communication system, and in particular, wireless communication systems. In wireless communication systems, communication signals that are transmitted by antennas over traffic channels and signaling channels will at some point propagate through the air and be received by other antennas. Thus, part of or all of the medium of the traffic and signaling channels is the air itself. The traffic channels are communication channels through which users of the wireless communication system convey (i.e., transmit and/or receive) communication signals to each other. The communication signals typically carry information being conveyed between users. The signaling channels are communication channels through which signals that facilitate the control, maintenance and management of the communication system are conveyed. The signaling signals are typically transmitted by system equipment and user equipment. System equipment are various communication equipment owned, controlled and operated by a system operator or provider. Examples of system operators include local telephone companies and Internet service providers. User equipment are equipment that are typically owned and operated by users of the communication system. Examples of user equipment include cellular phones, wireless personal computers and pagers.

As the communication signals propagate through the air, they are adversely affected by various anomalies that distort such signals and cause part or all of the information being carried by said signals to be received erroneously. The quality of the communication channels can greatly affect the communication system's throughput. The throughput is the amount of information that is received without any errors for a given period of time. The various anomalies of a communication channel can adversely affect any one or all of a signal's parameters; some of these parameters include signal amplitude, signal phase, signal frequency. The signals are transmitted by transmit antennas and received by receive antennas. It should be noted that the antennas are often designed to operate as both transmit and receive antennas. To reduce the anomalous effects of a communication channel, communication systems often employ a feedback technique where a receive antenna transmits channel quality feedback information to a transmit antenna allowing the transmit antenna to modify, in some fashion, one or more of the signal's parameters. The channel quality feedback information is information about how transmitted signals are affected by the communication channel through which they have propagated. The signals propagating through the communication channel can therefore be manipulated so as to be less vulnerable to the various channel anomalies; thus the adverse effects of the channel are effectively reduced thus increasing throughput. Also, to increase system throughput, the communication system can use more than one transmit antenna and more than one receive antenna for the same or different signals.

Suppose, there are two transmit antennas and two receive antennas. The same information is transmitted by both transmit antennas. Although, the signals carry the same information, they may have different parameters. Therefore, the signals may be affected differently by the communication channel. Even when the signals carry the same information and have the same parameters, they may still be affected differently by the communication channel. One feedback technique used by many communication systems is to have the receive antennas transmit channel quality feedback information to the transmit antenna informing the transmit antennas about the quality of the transmitted signals. The parameters of the transmitted signal least adversely affected by the communication channel is then used in ensuing transmissions by the transmit antennas in an effort to improve the quality of the received signals.

Another technique is to pre-modify (or pre-process) the transmit signals based on the channel quality feedback information received by the transmit antennas from the receive antennas. The pre-modification (or pre-processing) compensates for the anomalies that the transmitted signals experience as they propagate through the communication channel. The channel quality feedback information may be based on measurements of previously transmitted signals or measurements of various channel parameters from signals transmitted over the signaling channel. A signal that is typically transmitted over the signaling channel and measured by the system is the pilot signal. Many wireless communication systems have a pilot signal that, among other purposes, serves to signal the presence of system equipment.

Yet, another technique is to measure the amount of energy contained in the two receive signals and send that information back to the transmit antennas. The parameters of the signal having the higher measured energy will be used for the next transmission. In all of the above feedback techniques, a rather brute force method is used to determine which set of signal parameters will allow a transmitted signal to be relatively less adversely affected by the communication channel. These brute force methods require a relatively large amount of information to be fed back to the transmit antennas. Further, the channel quality feedback information is continuously being sent back to the transmit antennas. Many communication systems have limited bandwidth for their signaling channels through which other critical information are conveyed. It may not, therefore, be practical to send all of the feedback information. Also, because the communication channel is a continually varying dynamic system, it may not be possible to efficiently and quickly modify the transmit signal to reduce its vulnerability to the channel anomalies.

Some communication systems attempt to characterize the communication channel mathematically so as to be able to develop more comprehensive channel quality feedback information that can sufficiently track the variations in the communication channel. For example, the communication channel can be modeled as an Eigenspace represented by an eigenvector matrix whose elements are complex numbers each of which is a basic unit that represents one or more measured parameters of the communication channel. The measured parameters of the channel include, for example, the effect of the channel on a signal's amplitude, the effect of the channel on a signal's phase and the effect of the channel on a signal's frequency. The measured channel parameters are also called channel parameters. For example suppose a signal is transmitted with an amplitude of 0 db, but such signal is received with a measured amplitude of −3 dB. The channel parameter for amplitude is thus −3 dB. When more than one transmitter and receiver are used, a channel parameter matrix can be generated from measured channel parameters.

A channel matrix can thus be formed from measurements of channel parameters. Again suppose, there are two transmit antennas ($T_1$ and $T_2$) and two receive antennas ($R_1$ and $R_2$). The channel parameter measurement at receive antenna $R_1$ due to a signal transmitted by transmit antenna $T_1$ is designated $h_{11}$. The channel parameter measurement at receive antenna $R_2$ due to a signal transmitted by transmit antenna $T_1$ is designated $h_{12}$. The channel parameter measurement at receive antenna $R_1$ due to a signal transmitted by transmit antenna $T_2$ is designated $h_{21}$. The channel parameter measurement at receive antenna $R_2$ due to a signal transmitted by transmit antenna $T_2$ is designated $h_{22}$. The measured channel parameters are elements of the channel matrix H, where:

$$H = \begin{bmatrix} h_{11} & h_{12} \\ h_{21} & h_{22} \end{bmatrix}$$

and where $h_{11}, h_{12}, h_{21}$, and $h_{22}$ are complex numbers having complex conjugates $h_{11}^*, h_{12}^*, h_{21}^*$ and $h_{22}^*$. A channel correlation matrix is obtained by performing a Hermitian operation on the channel matrix and pre-multiplying the channel matrix with this Hermitian matrix. The Hermitian operation is a well known matrix mathematical conversion in which all of the elements of the matrix are changed to their complex conjugates and the transpose of the complex conjugate matrix is performed. Thus the Hermitian matrix of channel matrix H is $H^+$ where $H^+ = [H^*]^T$. The channel correlation matrix is designated as S where $S \equiv H^+ H$.

The elements of the channel correlation matrix, S, are related to eigenvalues and eigenvectors which can be obtained by a well known procedure called an eigenvalue decomposition, *Applied Linear Algebra*, 2d edition, Ben Noble, James W. Daniel, Prentice Hall Inc., 1977 and 1969, ISBN 0-13-041343-7. First it is recognized that $S = \Sigma \Lambda \Sigma^+$ where $\Sigma$ is the eigenvector matrix. $\Sigma$ is a unitary matrix meaning that $\Sigma^+ \Sigma = \Sigma \Sigma^+ = I$ where I is an identity matrix. $\Lambda$ is a diagonal eigenvalue matrix whose elements are eigenvalues and $\Sigma$ is a matrix whose columns are eigenvectors or equivalently eigenbeams. For a 2×2 system (i.e., two transmit antennas and two receive antennas):

$$\Lambda = \begin{bmatrix} \lambda_1 & 0 \\ 0 & \lambda_2 \end{bmatrix}$$

where elements $\lambda_1$ and $\lambda_2$ are the eigenvalues; and $\Sigma = [e_1 \ e_2]$ where $e_1$ and $e_2$ are eigenvectors which are the columns of the eigenvector matrix. Also, for a 2×2 system, $$I = \begin{bmatrix} 1 & 0 \\ 0 & 1 \end{bmatrix}.$$

Because S is known and I is a known constant matrix, the eigenvalues (i.e., $\lambda$) are obtained by solving the following equation:

$$\det[S - \lambda I] = 0$$

where det represents the determinant operation. The values for $\Sigma$ are then obtained by solving the equation $Se = \lambda e$; i.e., because S is known and $\lambda$ is known, e can be determined.

Once the eigenvectors are obtained, channel quality feedback information—represented in terms of the eigenvectors—is sent or fed back to the transmit antennas to allow these antennas to modify the transmit signals so as to reduce the distortion experienced by these signals.

The channel quality feedback information in the form of eigenvalues and/or eigenvectors represents a relatively large amount of information that is to be periodically transmitted over band-limited signaling channels of the communication system. Further, many times some of the channel information being transmitted in the form of eigenvalues and/or eigenvectors are not as accurate in their characterization of the communication channel. In other words, there are certain eigenvalues that more accurately represent the communication channel characteristics than other eigenvalues.

In a single-transmit-single-receive antenna system, the transmission power can be determined using the well known procedure called the water-filling approach. However, for a multiple-transmit-multiple-receive antenna system, this method will not work simply because the channels between different antennas are interfering with each other. In this case, it is usually assumed that the same transmit power is given for each eigenbeam. Artificial ways of providing different transmit power to different eigenbeams is possible but this involves experimental fine tuning to determined the amount of power should be given and is usually not very effective.

SUMMARY OF THE INVENTION

At a transmitter of a multiple-input multiple-output communication system, a symbol for transmission is pre-multiplied by an eigenvector matrix and a power vector. As discussed above, determining the eigenvector matrix is based on the decomposition of the channel correlation matrix (obtained based on receiver measurements) into the eigenvector matrix and an eigenvalue matrix. Typically, the eigenvector matrix is a unitary matrix with each column of the eigenvector matrix being referred to as an eigenbeam or transmit eigenbeam. The power vector includes a transmit power for each transmit eigenbeam.

The present invention is directed to a method of determining the transmit powers for the transmit eigenbeams. The transmit power for each eigenbeam in a set of eigenbeams may be determined based on noise associated with each eigenbeam in the set of eigenbeams.

In one exemplary embodiment, the noise associated with an eigenbeam may be determined based on a thermal noise value and at least one channel condition associated with the eigenbeam.

In another exemplary embodiment, a receive power associated the eigenbeam may be estimated based on a total available transmit power and the noise associated with each eigenbeam in the set of eigenbeams. Using the estimated receive power and the noise associated with each eigenbeam, the transmit power for each eigenbeam may be determined.

As an additional aspect of this exemplary embodiment, the set of eigenbeams may be modified to remove at least one eigenbeam when the determined transmit power for a desired number of eigenbeams is less than a power threshold.

Additionally, according to the present invention, the determined transmit powers may be used to further determine the code rate and modulation for transmission of each eigenbeam. In one exemplary embodiment, the code rate and modulation may be determined using a look-up table indexed by the determined transmit power and a desired quality of service indicator.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

Figure 1:
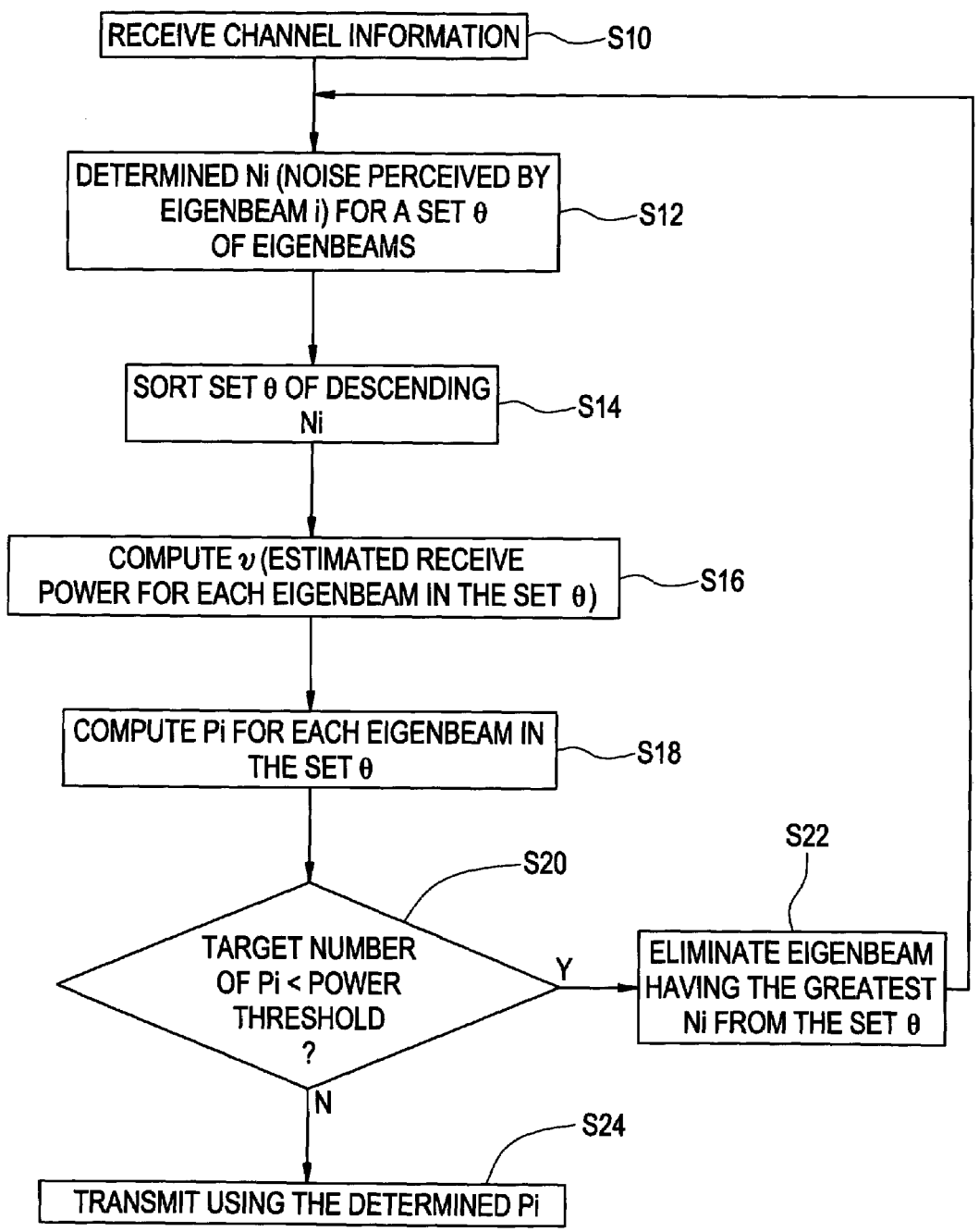
FIG. 1 illustrates a flow chart of an embodiment of the method for determining transmit power according to the present invention.

The present invention provides a method of improving the determination of the transmit power of each eigenbeam transmitted by over transmit antennas of a multiple-input multiple-output communication system. To better understand the method of the present invention, some of the eigenbeam forming information discussed in the background will be repeated, albeit in a way suited for better comprehending the present invention. Then some of the mathematical concepts used in deriving the present invention will be explained. Finally, an embodiment of the method of the present invention will be explained with reference to the flow chart illustrated in FIG. 1.

Some Preliminary Comments on M×N Eigen Beam Forming Systems

As discussed in the background of the invention section, in a M×N (M transmit antenna, N receive antenna) Multi-Input, Multi-Output (MIMO) system, the received flat fading channel at the receiver can be written as:

$$H = \begin{bmatrix} h_{11} & h_{21} & \cdots & h_{M1} \\ h_{12} & h_{22} & \cdots & h_{M2} \\ \vdots & \vdots & \ddots & \vdots \\ h_{1N} & h_{2N} & \cdots & h_{MN} \end{bmatrix} \quad (1)$$

where $h_{ij}$'s are independent identical distributed complex Gaussian random variables.

At the transmitter, a given transmitted symbol, x, is premultiplied by a given matrix $\Sigma$ and a given vector $\underline{P}$ as follows:

$$y = H \sum \begin{bmatrix} \sqrt{P_1}\, x_1 \\ \sqrt{P_2}\, x_2 \\ \vdots \\ \sqrt{P_M}\, x_M \end{bmatrix} \quad (2)$$

where the matrix $\Sigma$ is the eigenvector matrix obtained from performing the eigen decomposition of the channel correlation matrix $S=H^+H$ (+ is the matrix Hermitian operator), namely, $S=H^+H=\Sigma\Lambda\Sigma^+$, and where $P_i$ is the transmit power of the ith eigenbeam (i.e., a column of the eigenvector matrix $\Sigma$).

It should be noted that the transmitted symbols $x_1, x_2, \ldots, x_M$ can be either the same, partially different, or totally different. Also, it is clear that the transmitter has no prior information about the eigenvector matrix $\Sigma$. Therefore it is necessary for the receiver to feedback some information regarding the eigenvector matrix $\Sigma$.

A discussed in the background of the invention section, it is well-known that, at the receiver, a channel estimation can be performed to obtain the channel matrix H. The singular value decomposition of H is given by:

$$H=USV^+ \quad (3)$$

where the matrix V can be chosen such that V=$\Sigma$, the eigen matrix H+H. The eigen value matrix (with each column being an eigenbeam) is written as:

$$\Lambda = \begin{bmatrix} \lambda_1 & 0 & 0 \\ 0 & \ddots & 0 \\ 0 & 0 & \lambda_M \end{bmatrix} \quad (4)$$

The channel correlation matrix can then be expressed as:

$$S \equiv \begin{bmatrix} s_1 & 0 & 0 \\ 0 & \ddots & 0 \\ 0 & 0 & s_M \\ \vdots & \vdots & \vdots \\ 0 & 0 & 0 \end{bmatrix} = \begin{bmatrix} \sqrt{\lambda_1} & 0 & 0 \\ 0 & \ddots & 0 \\ 0 & 0 & \sqrt{\lambda_M} \\ \vdots & \vdots & \vdots \\ 0 & 0 & 0 \end{bmatrix} \quad (5)$$

And, the matrix U can be computed as:

$$U=HV^+S^{-1} \quad (6)$$

where $S^{-1}$ is the right pseudo-inverse of the channel correlation matrix S. It should be noted that when the number of received antennas is less than the number of transmit antennas, the number of non-zero singular values, $S^i$, decreases. Therefore the number of available eigenbeams for transmission also decreases.

Water Filling for M×N MIMO with Eigen Beamforming According to the Present Invention The total capacity C for M parallel complex Gaussian channels is $$C = \sum_i \log_2\left(1 + \frac{P_i}{N_i}\right), \quad (7)$$

where $P_i$ is the transmit power of the ith eigenbeam (i.e., transmit power of the ith transmit antenna transmitting the ith eigenbeam) and $N_i$ is the noise associated with each eigenbeam.

In a power limited system, the power allocated to the i-th eigenbeam $P_i$ would be subject to the following constraint, $$\sum_i P_i = P \quad (8)$$

where P is the total power available at the transmitter for the M transmit antennas. Using the Lagrange multiplier to solve for $P_i$, the following equation is derived:

$$J = \sum_i \log_2\left(1 + \frac{P_i}{N_i}\right) + \lambda \sum_i P_i - \lambda P$$

Taking the derivative and setting the derivative equal to zero yields the following:

$$\frac{\partial}{\partial P_i} J = \frac{1}{N_i + P_i} + \lambda = 0$$

$$\Rightarrow N_i + P_i = \frac{-1}{\lambda} \equiv v$$

$$\Rightarrow P_i = v - N_i$$

Here, $v$ represents an estimate of the total receive power of the ith eigen vector.

Since the power cannot be less than zero, the following must hold true:

$$P_i(v-N_i)^+ \text{ for } v-Ni>0$$

$$P_i=0 \text{ for } v-N_i<=0$$

However, it should be noted that a transmit power threshold of greater than zero could be chosen.

$$\sum_{i \in \Theta} (v - N_i)^+ = P \tag{9}$$

where $\Theta=\{i|(v-N_i)>0, \forall i=1, \ldots, M\}$. With eigen beamforming, the following provides an expression for the symbol r received at the receiver:

$$r = SPx + n = \begin{bmatrix} s_1\sqrt{P_1} & 0 & \cdots & 0 \\ 0 & s_2\sqrt{P_2} & \ddots & \vdots \\ \vdots & \ddots & \ddots & 0 \\ 0 & \cdots & 0 & s_M\sqrt{P_M} \\ \vdots & \vdots & \vdots & \vdots \\ 0 & \cdots & 0 & 0 \end{bmatrix} x + n$$

where n is a vector of additive white noise where each element is usually complex Gaussian distributed random variables. The size of the vector is equal to the number of received antenna in the system. It is assumed that $E_x \equiv E\{x_i\}=1$. The signal-to-noise ratio (SNR) at the i-th eigenbeam is given by:

$$SNRi = \frac{E_x}{\sigma_n^2} s_i^2 P_i$$

where $\sigma_n$ represents the variance in the thermal noise and is a preset design parameter established through empirical study.

The normalized noise, the noise associated each ith eigenbeam, may be computed as:

$$N_i = \frac{\sigma_n^2}{s_i^2} \tag{10}$$

Substituting the above into (9) and combining with (8) provides the following:

$$P = \sum_i P_i = \sum_i (v - N_i)^+ \tag{11}$$

$$\Rightarrow v = \frac{P + \sum_{i \in \Theta} N_i}{\sum_{i \in \Theta} 1}$$

where $\Theta=\{i|(v-N_i)>0, \forall i=1, \ldots, M\}$. Finally, the power allocated to the i-th transmit antenna or eigenbeam may be given by:

$$P_i = \begin{cases} (v - N_i), & \text{if } i \in \Theta \\ 0, & \text{if } i \notin \Theta \end{cases} \tag{12}$$

It should be noted that if the M<N, i.e. the number of transmit antennas is less than the number of receive antennas, and some of the channel correlation matrix values $s_i$ will be zero. In these cases, the power allocated to those particular eigenbeams also becomes zero. That is, there will be no transmission on those eigenbeams with zero channel correlation matrix values.

An Embodiment of the Present Invention

Next, an embodiment of the method of determining transmit power for each transmit eigenbeam in a multiple-input multiple-output communication system will be described with respect to FIG. 1. As shown, in step S10, a transmitter receives the channel information discussed above in both the background of the invention and detailed description sections. In step S12, the transmitter determines the normalized noise $N_i$ associated with each eigenbeam, for example, by using equation (10). It will be appreciated that the information necessary to compute the normalized noise $N_i$ for each eigenbeam was provided to the transmitter in step S10. Accordingly, for a set $\Theta$ of the eigenbeams that in one exemplary embodiment includes all of the eigenbeams, the transmitter determines the normalized noise $N_i$.

In step S14, the transmitter may sort the eigenbeams by their respective normalized noise $N_i$ in descending order (from largest to smallest). Then, in step S16, the transmitter computes the estimated receive power v, which may be expressed as the sum of the transmit power and the normalized noise variance (normalized by the square of the channel gain) on the i-th eigenbeam according to (11), for each eigenbeam in the set $\Theta$. After computing v, the transmitter may compute the transmit power for each eigenbeam $P_i$ using (12) in step S18.

Then in step S20, the transmitter may determine if the transmit power $P_i$ value is less than a transmit power threshold for a target number of the eigenbeams in the set $\Theta$. The target number and the transmit power threshold are design parameters set by a system operator, and can be varied based on the performance of the system and/or the conditions of the system. In one exemplary embodiment, the transmit power threshold is set to zero and the target number is set to 1. Accordingly, in this exemplary embodiment, if one of the transmit power $P_i$ values fails to exceed zero, then in step S22 the transmitter may remove an eigenbeam from the set Θ. Specifically, the transmitter removes the eigenbeam having the greatest normalized noise Ni. It should be understood, however, that many variations on this and the other steps are possible. For instance, for step S22, more than one eigenbeam could be removed from the set Θ. Also, the criteria in step S26 for removing an eigenbeam is not limited to the eigenbeam with the greatest normalized noise Ni. After step S22, processing returns to step S12 for the newly modified set Θ.

If in step S20, a target number of the transmit power $P_i$ values is not less than the transmit power threshold, then in step S24, the transmitter may transmit using those eigenbeams remaining in the set Θ, and may transmit at a power level $P_i$ determined for each eigenbeam. For instance, those eigenbeams not in the set Θ have their transmit power set to zero.

Adaptive Modulation and Code Rate Selection

Figure 2:
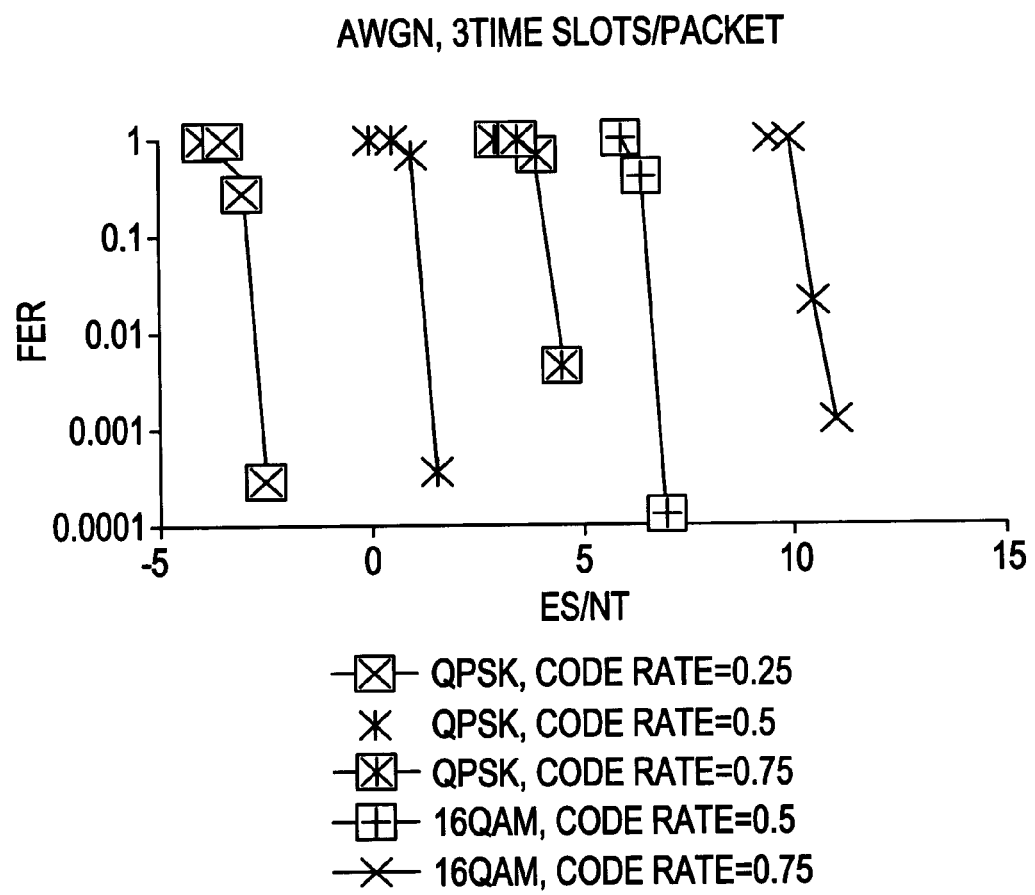
FIG. 2 illustrates a set of curves for determining the adaptive modulation scheme and code rate according to an embodiment of the present invention.

A further aspect of the present invention may include using the determined transmit powers $P_i$ to determine the adaptive modulation scheme and code rate for the transmission of each eigenbeam. With reference to equation (2) above, for a given $P_i$, a particular modulation and code rate may be chosen to match a chosen maximum PER (packet error rate). According to the present invention, a set of curves with $E_s/N_t$ as the x-axis and PER as the y-axis may be generated and stored as a look-up table at the transmitter. Each of the curves corresponds to a particular modulation and code rate obtained in a certain type of channel using a SISO (single-input single-output) system. The type of channels can be either AWGN, Quasi-stationary fading channel, time-varying fast Rayleigh/Ricean fading channel, etc. depending on the target application. FIG. 2 illustrates a set of such curves in an AWGN channel according to one exemplary embodiment of the present invention.

According to this further aspect of the invention, in step S28, the transmitter uses the PER and the determined $P_i$ as an index to access the appropriate adaptive modulation scheme and code rate. For example, using the set of curves in FIG. 2, if $P_i$ is equal to 5 dB, and the maximum allowable PER is 1%, then modulation and code rate chosen for the i-th eigenbeam—will be QPSK with rate 0.75.

The invention being thus described, it will be obvious that the same may be varied in many ways. Such variations are not to be regarded as a departure from the spirit and scope of the invention, and all such modifications are intended to be included within the scope of the following claims.

We claim:

1. A method, comprising:
   estimating a receive power associated with each eigenbeam in a set of eigenbeams for at least a portion of a multiple transmit antenna system based on the total available transmit power for the multiple transmit antenna system and a noise associated with each eigenbeam in the set of eigenbeams;
   determining a transmit power for each eigenbeam in the set of eigenbeams based on the normalized noise associated with the eigenbeam and the estimated receive power; and
   modifying the set of eigenbeams to remove at least one eigenbeam when the determined transmit power for a desired number of eigenbeams is less than a power threshold.

2. The method of claim 1, further comprising:
   repeating the estimating, determining and modifying steps until the determined transmit power for the desired number of the eigenbeams in the set is not less than the power threshold.

3. The method of claim 2, wherein the modifying step modifies the set of eigenbeams by removing the eigenbeam in the set having the highest associated noise.

4. The method of claim 3, wherein the power threshold is zero.

5. The method of claim 4, wherein the desired number is one.

6. The method of claim 1, further comprising:
   determining a code rate for transmission of each eigenbeam in the set of eigenbeams based on the determined transmit power for the eigenbeam.

7. The method of claim 6, wherein the determining a code rate step determines the code rate using a look-up table indexed by the determined transmit power and a desired quality of service indicator.

8. The method of claim 1, further comprising:
   determining a modulation scheme for transmission of each eigenbeam in the set of eigenbeams based on the determined transmit power for the eigenbeam.

9. The method of claim 8, wherein the determined a modulation scheme step determines the modulation scheme using a look-up table indexed by the determined transmit power and a desired quality of service indicator.

10. The method of claim 9, further comprising:
    determining a code rate for transmission of each eigenbeam in the set of eigenbeams based on the determined transmit power for the eigenbeam.

11. The method of claim 10, wherein the determining a code rate and a modulation scheme steps concurrently determine the code rate and modulation scheme using a single look-up table indexed by the determined transmit power and a desired quality of service indicator.

\* \* \* \* \*